(12) United States Patent
Dasgupta et al.

(10) Patent No.: US 11,977,046 B2
(45) Date of Patent: May 7, 2024

(54) ELECTROCHEMICAL CELL CONFIGURED TO HAVE A DYNAMICALLY RENEWED ELECTRODE

(71) Applicants: Dionex Corporation, Sunnyvale, CA (US); Board of Regents, The University of Texas System, Austin, TX (US)

(72) Inventors: Purnendu Dasgupta, Arlington, TX (US); Charles P. Shelor, Arlington, TX (US); Kannan Srinivasan, Chelmsford, MA (US); Christopher A. Pohl, Union City, CA (US)

( * ) Notice: Subject to any disclaimer, the term of this patent is extended or adjusted under 35 U.S.C. 154(b) by 0 days.

(21) Appl. No.: 17/562,237

(22) Filed: Dec. 27, 2021

(65) Prior Publication Data
US 2022/0205942 A1 Jun. 30, 2022

Related U.S. Application Data

(60) Provisional application No. 63/132,597, filed on Dec. 31, 2020.

(51) Int. Cl.
*G01N 27/30* (2006.01)
(52) U.S. Cl.
CPC .................... *G01N 27/30* (2013.01)
(58) Field of Classification Search
CPC ...... G01N 27/28; G01N 27/30; G01N 27/327; G01N 27/403; G01N 27/416
See application file for complete search history.

(56) References Cited

U.S. PATENT DOCUMENTS

| 4,059,406 A * | 11/1977 | Fleet ...................... G01N 27/38 |
| | | 205/794.5 |
| 5,399,256 A | 3/1995 | Bohs et al. |
| 2003/0111340 A1 | 6/2003 | Cheng et al. |
| 2008/0182136 A1* | 7/2008 | Arnold .................. G01N 21/66 |
| | | 429/246 |

(Continued)

FOREIGN PATENT DOCUMENTS

JP 60-104250 A 9/1994

OTHER PUBLICATIONS

International Search Report and Written Opinion dated Apr. 7, 2022 for International Application No. PCT/US2021/065271, 17 pages.

(Continued)

*Primary Examiner* — Caitlyn Mingyun Sun
(74) *Attorney, Agent, or Firm* — Frost Brown Todd LLP

(57) ABSTRACT

An electrochemical cell comprises a chamber, an inlet port, an outlet port, an electrode port, and a counter electrode. The inlet port is configured to allow flow of a liquid into the chamber and through an inlet opening toward the working electrode, and the outlet port is configured to allow flow of a liquid out of the chamber and through an outlet opening. The device is configured so that a force applied to the working electrode slides the first end face of the working electrode to a distance from a face of the inlet opening due to the balancing force of a fluid flowing out of the inlet opening. The device may be used in a method for analyzing an analyte, such as one or more amino acids in a liquid sample.

17 Claims, 9 Drawing Sheets

(56) References Cited

U.S. PATENT DOCUMENTS

2014/0102916 A1* 4/2014 Louw .................... G01N 30/64
  205/780.5
2020/0377800 A1* 12/2020 Carson .................... C10G 9/20

OTHER PUBLICATIONS

Dorneanu S A et al; "Nasicon Membrane Used as Na+-selective Potentiometric Sensor in Steady State and Transient Hydrodynamic Conditions", Sensors and Actuators B: Chemical, Elsevier BV, NL, vol. 91, No. 1-3, Jun. 1, 2003, 9 pages.

\* cited by examiner

ELECTROCHEMICAL CELL CONFIGURED TO HAVE A DYNAMICALLY RENEWED ELECTRODE

CROSS REFERENCE TO RELATED INFORMATION

This application claims the benefit of U.S. Provisional Patent Application No. 63/132,597, filed Dec. 31, 2020, titled Electrochemical Cell Configured To Have A Dynamically Renewed Electrode the contents of which are hereby incorporated herein in its entirety.

TECHNICAL FIELD

The present disclosure is directed to using an electrochemical cell to detect the presence of analytes and more specifically to an electrochemical cell with a dynamically renewing electrode.

BACKGROUND OF THE INVENTION

Electrochemical detection of some analytes results in fouling of the electrode from the redox reaction products, which causes its sensitivity to be degraded with use. For example, oxidation by-products can result in a partially insulating polymer film that fouls the electrode surface. In addition to fouling, dissolution of the electrode may occur leading to reductions in sensitivity if the dissolution of the electrode results in a recession of the electrode face beneath the shear plane of the flow path in the electrochemical detector cell. Long-term operation can be problematic when offline cleanup procedures or electrode replacement is required. In particular, under certain conditions, amino acids and carbohydrates can be measured using electrocatalytic oxidation on a variety of electrodes, which can be consumed in the process, or become coated with oxidation products.

BRIEF SUMMARY OF THE INVENTION

In a preferred embodiment, a device using an electrochemical cell to detect the presence of analytes is described. The electrochemical cell includes a chamber, an inlet port, an outlet port, an electrode port, and a counter electrode. The inlet port is configured to allow flow of a liquid into the chamber and through an inlet opening, and the outlet opening is configured to allow flow of a liquid out of the chamber. The working electrode surface can be replenished by dissolving a portion of the front end face that exposes a fresh underlayer of the bulk metal electrode. The surface of the first end face of the working electrode is kept at a distance from a face of the inlet opening, thus maintaining the diffusional pathway, linear velocity of electroactive analytes, and the detection sensitivity. The electrode port houses a cylindrical working electrode and is configured to allow a first end of the working electrode to slide into the chamber. The area of the first end face of the working electrode is larger than the area of the inlet. The device is configured so that a force applied to the working electrode slides the first end face of the working electrode to a distance from a face of the inlet opening due to the balancing force of a fluid flowing out of the inlet opening. The device may be used in a method for analyzing an analyte, such as amino acids or carbohydrates in a liquid sample.

In another preferred embodiment, a method of analyzing an analyte in a liquid sample is described. The method included providing an electrochemical cell, flowing an eluate and the liquid sample, the liquid sample comprising at least one analyte through the inlet port and detecting at least one analyte at the electrode by an electrochemical reaction and measuring the electrical signal generated between the working electrode and the counter electrode. The method further includes electrochemically removing a portion of the surface of a first end face of the working electrode and advancing the working electrode into a chamber so that the first end face of the working electrode is at a distance from a face of the inlet opening.

In yet another preferred embodiment, a device for the electrochemical detection of analytes in a liquid is described. The device includes a chamber having an inlet port, an outlet port and a working electrode port, the inlet port configured to allow flow of the liquid into the chamber, and the outlet port configured to allow flow of the liquid out of the chamber. A counter electrode is in liquid communication with the cell and a working electrode is movably housed in the working electrode port and in liquid communication with the cell and electrical communication with the counter electrode. The working electrode is configured to allow a first end of the working electrode to slide into the chamber where an area of a first end face of the working electrode is larger than an area of the inlet port. A counter force is applied to the working electrode such that the working electrode slides toward an opening in the inlet port to a known distance from inlet port opening due to a balancing of a force of a fluid flowing out of the inlet opening towards the first end face of the working electrode.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and constitute a part of this specification, illustrate embodiments, and together with the general description given above, and the detailed description of the embodiments given below, serve to explain the principles of the present disclosure.

DETAILED DESCRIPTION OF THE INVENTION

Figure 1:
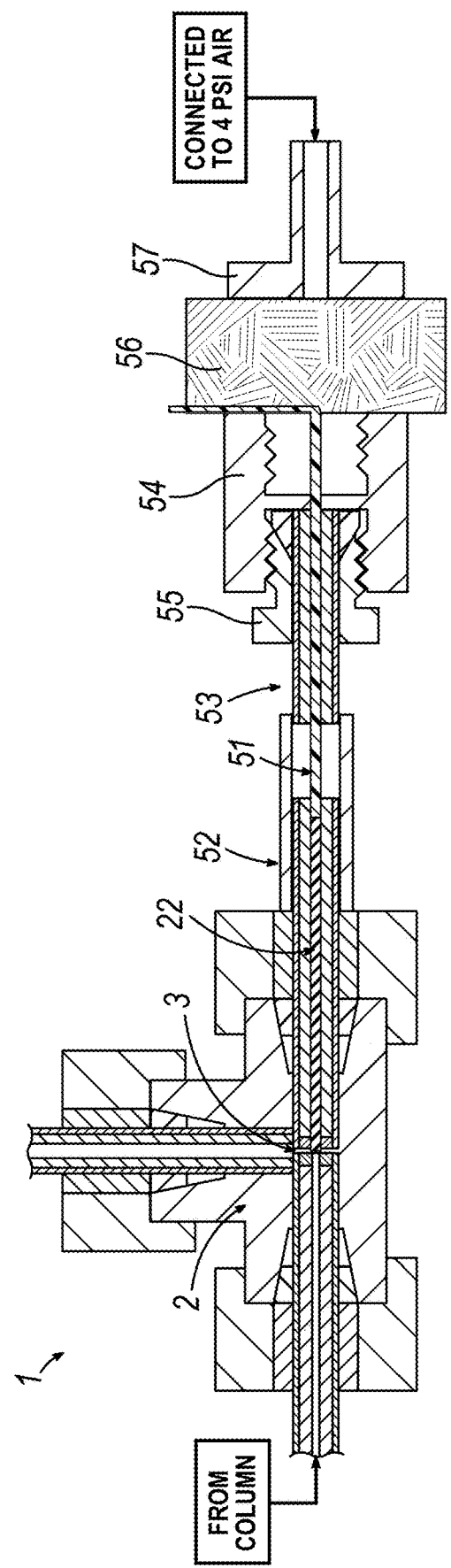
FIG. 1 is a cross sectional view of an embodiment of the device.
Figure 2:
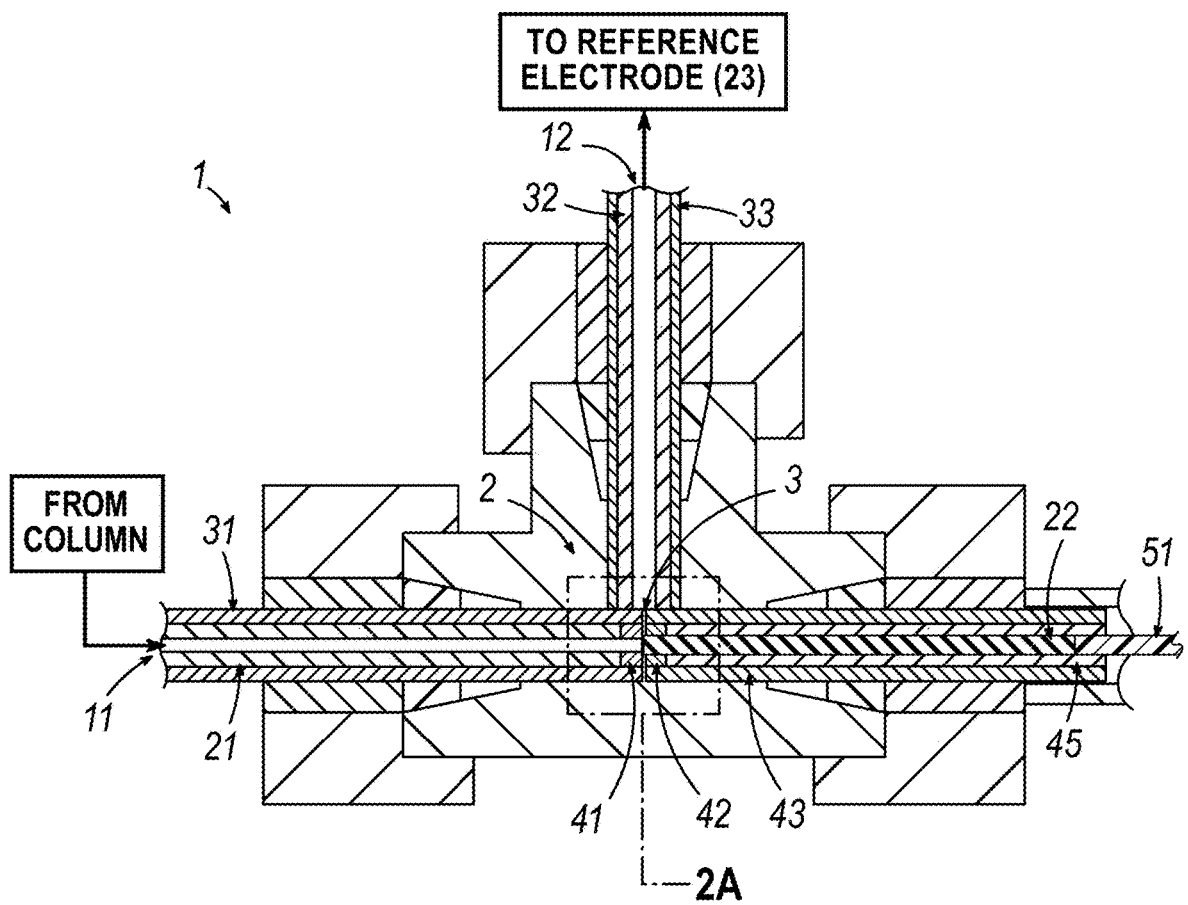
FIG. 2 is a blow-up cross-sectional view of the embodiment of the device of FIG. 1.
Figure 2A:
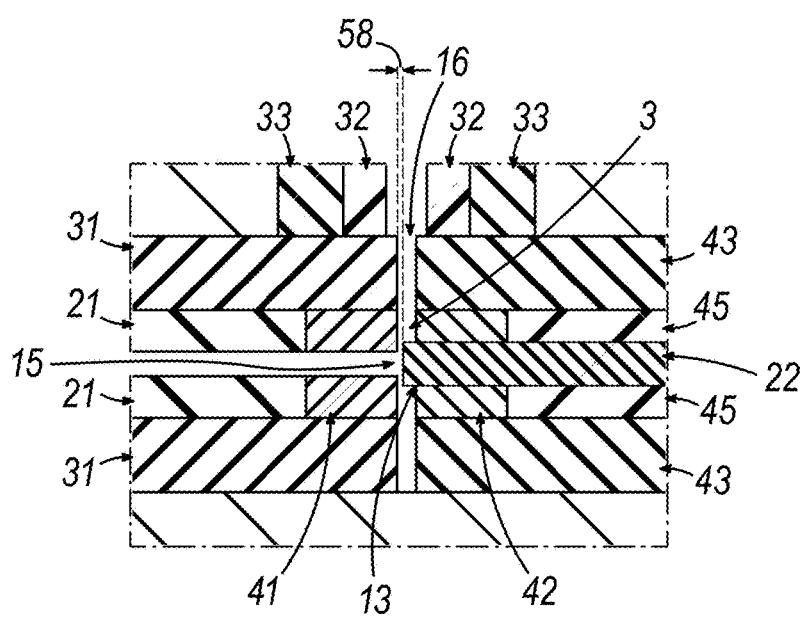
FIG. 2A is a blow up of a part of FIG. 2.
Figure 3:
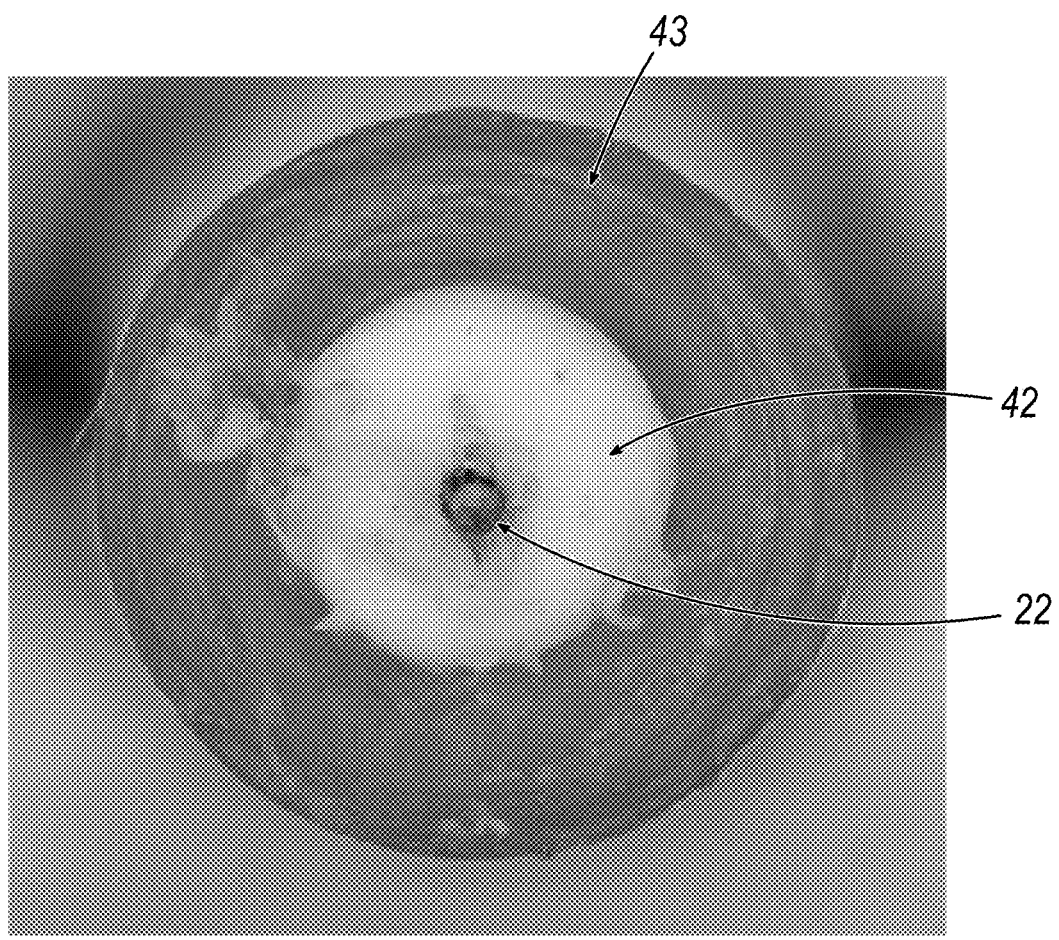
FIG. 3 is a schematic of the end view of the working electrode.

FIGS. 1, 2, and 2A show a device (1) comprising an electrochemical cell (2). The electrochemical cell (2) comprises a chamber (3), an inlet port (11), an outlet port (12), an electrode port (13), and a counter electrode (21). The inlet port is configured to allow flow of a liquid into the chamber and through an inlet opening (15) toward the working electrode, and the outlet port is configured to allow flow of a liquid out of the chamber and through an outlet opening (16). The electrode port houses a cylindrical working electrode (22) and is configured to allow a first end of the working electrode to slide into the chamber. The area of the first end face of the working electrode is larger than the area of the inlet opening. Referring to FIG. 2A, the first end face represents a circular area at the end of the cylindrical electrode (22). The device is configured so that a force applied to the working electrode slides the first end face of the working electrode to a distance from a face of the inlet opening due to the balancing force of a fluid flowing out of the inlet opening. The first end of the working electrode can represent the first end face of the working electrode along with a side surface area of exposed cylinder expressed from a seal (42). During operation of the electrochemical cell, the first end face of the working electrode can be flush with an end face of seal (42) or alternatively the first end face of the working electrode can be expressed outwardly from the end face of seal (42) with a small portion of the side surface area of cylinder. In some embodiments, the device is further configured so that the force applied to the working electrode is applied to a second end of the working electrode, and the second end is opposite to the first end.

The device may be used as a detector, which is in liquid communication with one or more components of a liquid chromatography system. The eluate flows from the liquid chromatography column into the inlet port, through the chamber and out the outlet port. The device is able to detect analytes by electrochemical processes that result in electron transfer as the analytes pass through the chamber and contact the working electrode. In some embodiments, the analytes are amino acids or carbohydrates. In some embodiments, the analytes are amino acids. In some embodiments, the analytes are carbohydrates.

A method for analyzing an analyte in a liquid sample comprises the steps of a) providing an electrochemical cell. b) Using an eluate to flow the liquid sample comprising at least one analyte through the inlet port toward the working electrode. c) The analyte is detected by an electrochemical reaction between the analyte and the working electrode and the measuring of the electrical signal generated between the working electrode and the counter electrode. It is believed that amino acids are detected by either electrocatalytic amino acid oxidation at the working electrode, or oxidative chelation of the working electrode, or a combination thereof d) Electrochemically removing a portion of the surface of a first end face of the working electrode to renew its surface. e) Advancing the working electrode into the chamber so that the first end face of the working electrode is at a distance from a face of the inlet opening. The force applied to the working electrode pushes the first end face of the working electrode to be a distance from a face of the inlet opening. The balancing force is the fluid flowing out of the inlet opening. In some embodiments, the distance from the first end face of the working electrode to face of the inlet opening is a constant distance. A constant distance or gap can be a relatively constant value so that variability of the measured analyte concentration changes by less than 5% per hour, preferably less than 3% per hour, more preferably less than 2% per hour, and yet more preferably less than 1% per hour.

Figure 4:
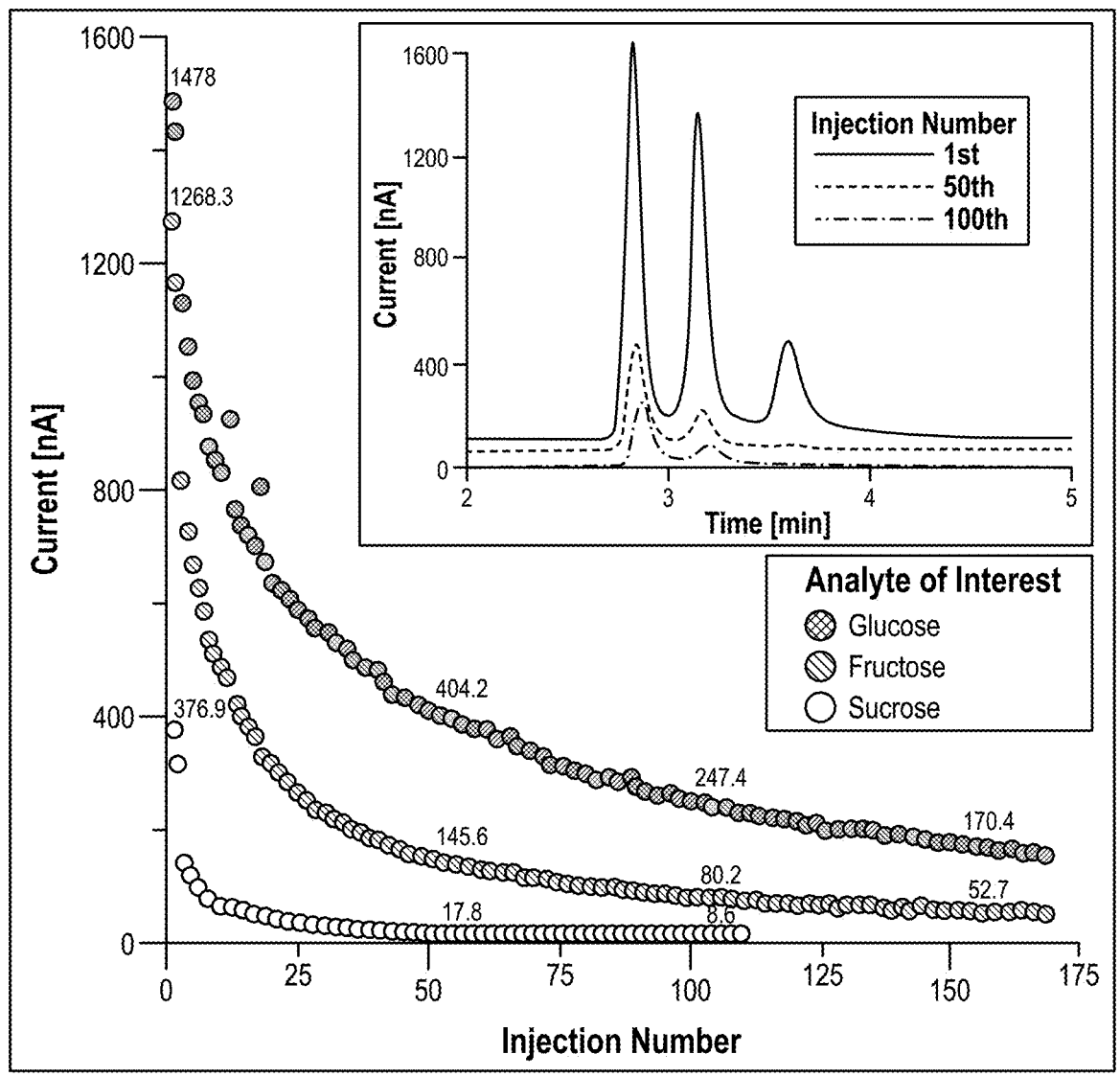
FIG. 4 is a graph of the degradation of current response of a gold electrode over time operated with a constant applied potential.

Electrochemical processing of the analyte at the working electrode often leads to eventual fouling of the electrode surface. Increasing the working electrode potential above the oxidation potential of the electrode metal will cause the surface to oxidize and in a suitable flowing medium dissolve, removing the foulants with the dissolved metal and renewing the electrode surface. In some instances, such as detection of amino acids on a copper electrode, the working electrode surface oxidatively dissolves, removing a layer of the exposed electrode face and then freshly exposing an unfouled surface. A similar situation may be involved in the detection of carbohydrates at a copper electrode where the oxidation products of the electrode, e.g., copper ion, is complexed by the carbohydrate or by the oxidation product of the carbohydrate, which may be an aldehyde or a carboxylic acid. An example of the degradation of a gold electrode over time is shown in the graph of FIG. 4. A mixture of glucose, fructose and sucrose were injected into an electrochemical cell detector at a concentration of 100 ppm, a flow rate of 63 DL/min, and an injection volume of 400 nL. The applied voltage at the working electrode was +0.2 Volts vs. a Ag/AgCl reference electrode. The eluent concentration was 60 mM KOH with a column temperature of 30° C. As can be seen in FIG. 4, the current signal degrades significantly in the first 25 injections and in some instances is unusable by the 100th injection.

In some embodiments, the electrode surface is intentionally cleaned using a sequence of applied potential or added reagents intended to dissolve the surface, or both, so that a clean surface becomes available. Without a slidable working electrode and a force to push the electrode into the chamber, this dissolution would result in increasing the gap (distance) between the working electrode surface and the inlet opening. Any electrode material, which permits facile surface renewal through electrochemical and/or chemical dissolution, can be used. In some embodiments, the working electrode comprises copper metal. In some embodiments, the working electrode comprises gold metal. Examples of electrode materials include, but are not limited to gold, platinum, palladium, silver, carbon, titanium, cobalt, iron, molybdenum, tantalum, tungsten, rhodium, bismuth, antimony, tellurium, lead and combinations and modifications thereof.

At a gold electrode, analytes are electrocatalytically oxidized at the gold surface under an applied potential and the oxidation current is measured and used to determine analyte concentration. At a copper electrode, presence of some analytes such as amino acids result in oxidative chelation of the copper electrode; direct oxidation of the analyte may also simultaneously occur.

The potentials required to dissolve or oxidize different electrode materials are available in tabulations of standard redox potentials for common electrode materials. The potentials are commonly cited with reference to the Standard hydrogen Electrode. The potential necessary to oxidize the electrode to its ionic form will result in dissolution of the electrode. For example, copper can be oxidized to the cupric ion (copper +2) at 0.337 V whereas gold can be oxidized to auric ion (gold +3) at 1.52 V. The exact potential required to dissolve the electrode surface is dependent upon the pH and temperature of the solution and the presence of other chemical species in the solution. Relative to what can be calculated from tabulated standard potentials, different materials may require characteristic overpotentials to commence actual dissolution of the electrode.

Electrochemical oxidation can cause the solid electrode material exposed to the eluate to dissolve into the eluate. This removal of a portion of the exposed electrode causes the electrode length to decrease. However, instead of having a larger gap between the inlet opening and the first face of the electrode, the applied pressure means the electrode is continuously pushed towards the inlet opening while the fluid exiting the inlet opening pushes it back so that the gap (distance) between the inlet opening and the first face of the electrode remains approximately the same (distance). It is worthwhile to note that the vector force applied to the working electrode with the pressure means is approximately equal to an opposing vector force from the inlet opening, which causes the gap to be constant in a dynamically balanced fashion.

The device is configured so that the working electrode (22) can slide into the chamber. It is configured to slide into the chamber as the tip of the electrode dissolves during use. In some embodiments, the electrode port (13) is formed from a gasket or seal (42). An electrode conduit (43) that comprises a slide conduit (45) that allows the electrode to easily slide. Examples of the slide conduit include, but are not limited to polytetrafluoroethylene (PTFE), polyetheretherketone, ethylene tetrafluoroethylene (ETFE), polyethylene, and polypropylene. The conduits are those that are typically used in chromatography and flow injection analysis applications. They have a smooth bore and a low coefficient of friction. The end face of seal (42) is adjacent to chamber (13) and may be referred to as a shear plane. The gasket seals around the electrode and prevents any flow of the eluate through the electrode port. Examples of the gasket include, but are not limited to silicone, ethylene propylene diene monomer (EPDM), and fluoroelastomers, such as Viton or Kalrez, and other rubbers resistant to acid or base attack. The gasket can be a silicone material and have the electrode pierced through it at the electrode port. The silicone material forms a liquid tight seal around the electrode and with an inner bore of electrode conduit (43).

In some embodiments, the device further comprises a means for applying pressure to the second end of the working electrode so it can slide into the chamber. Examples of the means for applying pressure include, pneumatic, hydraulic, and spring based techniques. In some embodiments, regulated gas pressure is used to apply pressure to the second end of the working electrode. FIG. 1 shows a device that uses a pneumatic means for applying pressure to the second end of the working electrode. A rigid tungsten wire (51) is in contact with the second end of the working electrode. The tungsten wire (51) is held and oriented by guide tubing (52), plastic tubing (53), and a PEEK union (54) and nut (55). Foam (56) is located between the union and a transmission element (57) operatively connected to the air source.

The first end face of the working electrode is positioned at a distance (i.e., gap 58 as illustrated in FIG. 2A) from a face of the inlet opening (11). The distance is determined by a balance of forces, the pressure exerted by the liquid from the chromatography column and the pressure applied to the working electrode. At a fixed flow rate of the liquid from the chromatography column and a finite constant flow resistance represented by outlet opening and components thereafter, the distance is controlled by the pressure applied to the second end of the working electrode. Typically, a HPLC pump will pump at a fixed flow rate and vary the applied pressure accordingly to achieve the targeted flow rate. This distance can be changed to achieve the optimum sensitivity. When a liquid is not flowing through the inlet opening, the gap between the working electrode and the inlet opening may be different than the optimal distance but restoration of the flow will restore the electrode to its optimal position.

The working electrode is electrically connected to a potentiostat or other electronics capable of maintaining the working electrode potential at a constant value relative to some reference electrode potential and monitoring the current. In addition, the counter and reference electrodes are also electrically connected to the same potentiostat. Referring to FIG. 2, one end of tungsten wire (51) is in physical contact to form an electrical connection to the second end of the working electrode (22). A potentiostat is configured to maintain the working electrode (22) at some constant potential relative to the reference electrode. The potentiostat is also configured to measure the current flowing between the working electrode and the counter electrode. This operation may be carried out for a specific time period before the working electrode potential (relative to the reference electrode) is changed.

The counter electrode is part of the electrochemical cell and functions as the opposite electrode from the working electrode. In some embodiments, the device further comprises a reference electrode (23). In some embodiments, a reference electrode (23) is configured to be in liquid communication with the cell such as, for example, downstream of the outlet port. In some embodiments, the reference electrode and the counter electrode are both configured to be in liquid communication with the outlet port.

The inlet port, outlet port, and electrode port may be configured in any orientation provided they all open into the chamber. In some embodiments, the inlet port and the electrode port are located opposite to each other. In some embodiments, the electrochemical cell is configured so the first end face of the working electrode slides to cover at least a portion of the inlet opening. In some embodiments, the working electrode may slide into the chamber so that the first end face is able to cover the inlet opening.

In some embodiments, the inlet port comprises an inlet conduit (31) and the counter electrode (21) is within at least a portion of the inlet conduit, wherein the counter electrode is a counter electrode conduit. A gap between the working electrode and the counter electrode is sufficient to isolate the two electrodes. In some embodiments, an insulating spacer (41) is located at the end of the counter electrode between the counter electrode and the working electrode, which acts as a spacer between the counter electrode and the working electrode. The insulating spacer may be a conduit. Examples of insulating spacers include, but are not limited to, polyetheretherketone (PEEK), polytetrafluoroethylene, ethylene tetrafluoroethylene, and similar compositions. The inlet conduit transports the eluate from the liquid chromatography system to the device.

In some embodiments, the outlet port comprises an outlet conduit (32). The outlet conduit transports the eluate out of the device. In some embodiments, there is a jacket (33) cladding around the conduit (32). In some embodiments, the counter electrode is part of the wall of the chamber. In some embodiments, the reference electrode (23) is in fluid communication with the outlet port. In some embodiments, a reference electrode (23) is in the form of a flow cell that is downstream and in fluid communication with the outlet conduit.

A liquid chromatography system can include components such as a pump, an injection valve, a chromatography column, and a detector. In some embodiments, the inlet port is fluidly connected to a liquid chromatography column. The eluate from the column flows through the inlet port into the chamber. The eluate is under pressure from the chromatography system. The pressure of the eluate after attenuation by the column and other components upstream of the detector, is applied against the first end of the working electrode. In some embodiments, when the chromatographic flow is increased the increased pressure can be countered by the pressure applied to the working electrode to ensure a programmed distance from the inlet opening to maintain optimum detection sensitivity.

While the present disclosure has illustrated by description several embodiments and while the illustrative embodiments have been described in considerable detail, it is not the intention of the applicant to restrict or in any way limit the scope of the appended claims to such detail. Additional advantages and modifications may readily appear to those skilled in the art. Furthermore, features from separate lists can be combined; and features from the examples can be generalized to the whole disclosure.

EXAMPLES

Example 1—Detection Procedure

A copper wire of 0.225 mm diameter was used as the working electrode for the detection of amino acids. A stainless steel tube, 1.6 mm in outer diameter, 0.127 mm in inner diameter was used as the inlet conduit and counter electrode from the chromatographic column. The electrodes are separated by approximately 1 mm. As the surface of the working electrode dissolves, the electrode is continuously advanced by the pressure applied to a 0.25 mm tungsten wire connected to a pneumatic piston pressurized with 4 psi on an area that generates ~0.7 pounds of force, transmitted to a 0.25 mm diameter wire. The tungsten wire also provided electrical contact to the working electrode. The two electrodes were connected to the inputs of a commercial chromatographic electrochemical detector. Amperometry was performed at several DC potentials and the response of amino acids eluting from the column was measured. A pH reference electrode and flow cell were connected downstream from the detector. All working electrode potentials stated are stated relative to the pH electrode as reference. It should be noted that the pH electrode was a combination electrode that includes an Ag/AgCl electrode.

Example 2—Electrode Potentials for Detecting Amino Acids

Figure 5:
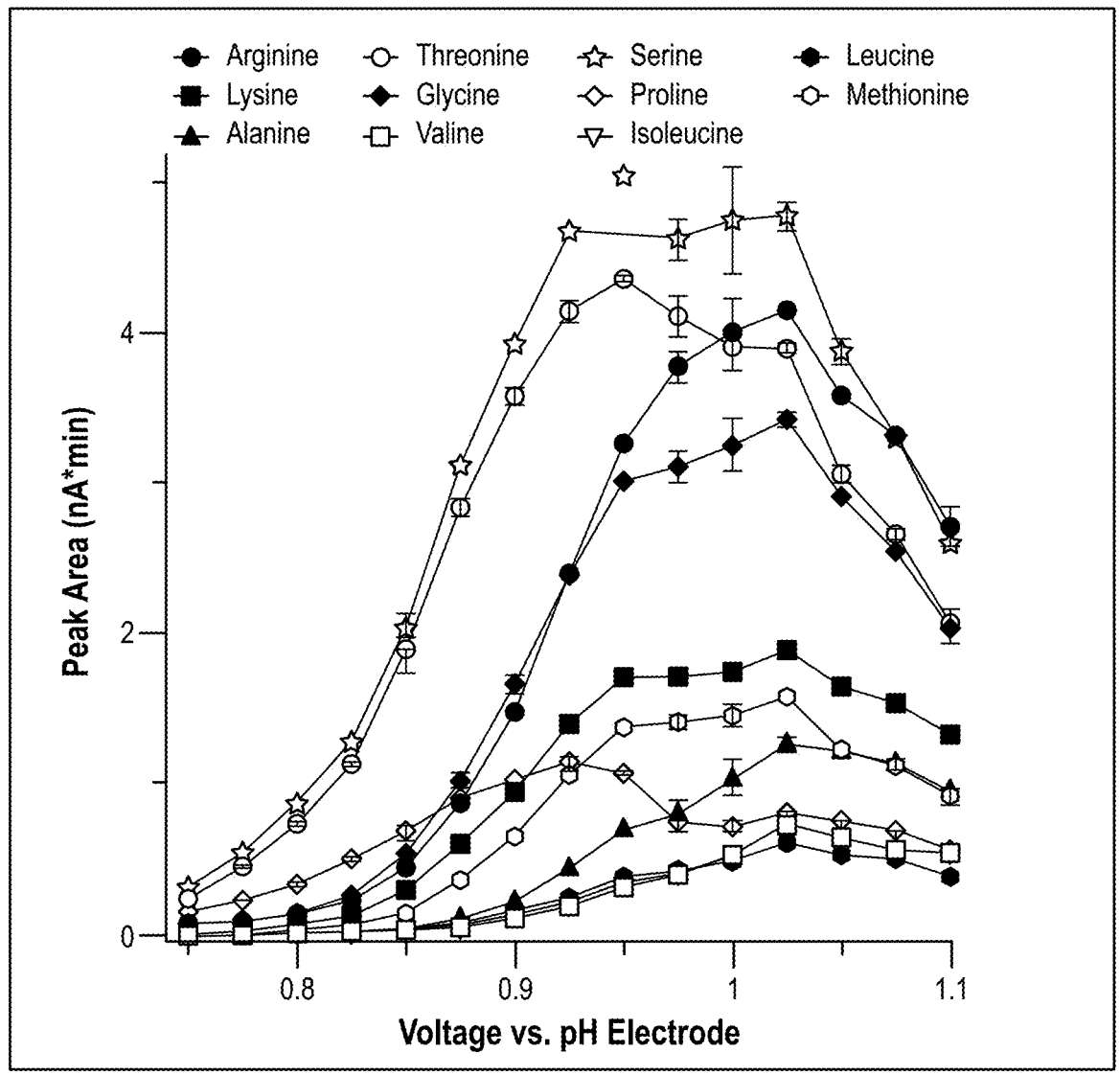
FIG. 5 is a graph of peak areas of 11 different amino acids as a function of the electrode voltage.

A suite of 11 amino acids (100 µM) were tested at various electrode potentials at 25 mV intervals from 7.5-1.1 V to find the optimum voltage for the working electrode. These 11 amino acids were separated on an Amino-Pac PA10 (2×250 mm) column at 0.25 mL/min separated using NaOH at 35° C. using a Thermo Scientific Dionex ICS-5000 ion chromatography system (Thermo Fisher Scientific, Sunnyvale, California, USA). Results are shown in FIG. 5. The gradient separation was carried out using 10-18 mM NaOH from 0.1-12 min followed by an 8 minute re-equilibration at 10 mM NaOH. Not all amino acids reached a maximum peak response at the same voltage; amino acids containing hydroxyl groups, such as serine and threonine, appeared to reach a maximum at lower voltages than the other amino acids (~0.95 vs 1.025 V).

Example 3—Stability of Detection Through Multiple Samples

A gradient method was developed using NaOH and sodium methanesulfonate (NaMSA) for the separation of 15 amino acids. Solutions of 250 mM NaOH (from high purity 50% w/w NaOH solution) and 1000 mM sodium methanesulfonate were prepared manually. The sodium methanesulfonate solution was prepared by weighing out a stoichiometric amount of methanesulfonic acid, diluting in 50% of the required water, and mixing with ~98% of the NaOH required for neutralization. Complete neutralization was then carried out using the 250 mM NaOH solution and testing by placing a drop on universal pH paper. The sodium methanesulfonate was then diluted to the required volume. The gradient program is as follows: 0-3 min 25 mM NaOH and 0 mM sodium methanesulfonate, 3-12 min 25 mM NaOH and 0-60 mM sodium methanesulfonate, 12-20 min 25 mM NaOH and 60-200 mM sodium methanesulfonate, 20-23 min 25 mM NaOH and 200-500 mM sodium methanesulfonate, 23-25 min 25 mM NaOH and 500 mM sodium methanesulfonate, 25-25.1 min 25-200 mM NaOH, 500-0 mM sodium methanesulfonate, 25.1-30 min 200 mM NaOH and 0 mM sodium methanesulfonate, 30-30.1 min 200-25 mM NaOH and 0 mM sodium methanesulfonate, and lastly re-equilibration from 30.1-45 min with 25 mM NaOH and 0 mM sodium methanesulfonate.

Figure 6:
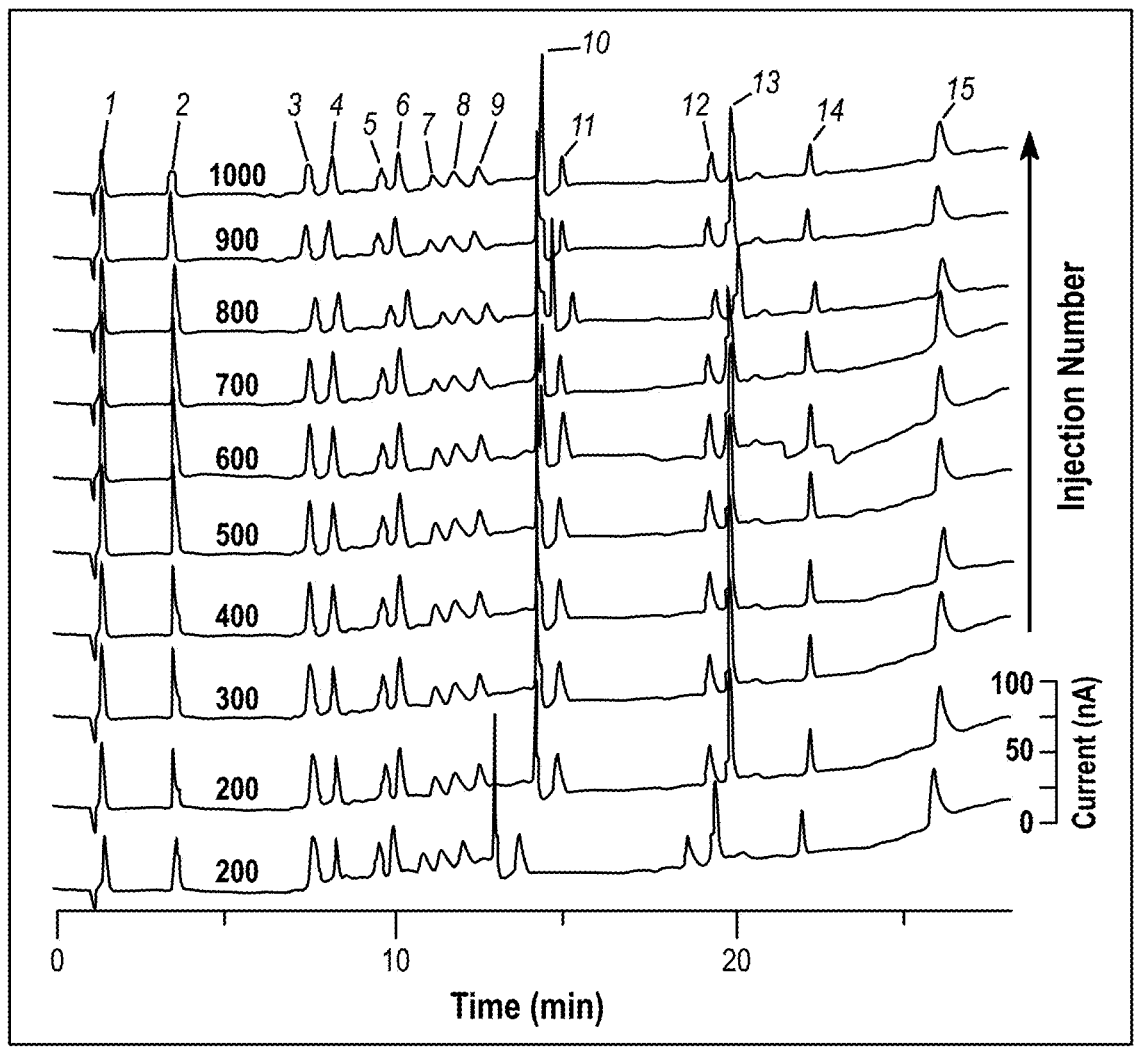
FIG. 6 is a graph of every 100th chromatogram of the first 1000 injections of a sample containing a mixture of amino acids.

Every 100th chromatogram was taken for the first 1000 injections and the overlay is shown in FIG. 6. The peaks and concentrations are provided in the figure caption. The transition zone between OH– and MSA– is marked by histidine (~14 min, peak 10), which is highly focused in this region. Care was taken to minimize handling time of NaOH and to purge CO2; the reservoir vent was also equipped with a soda lime trap. The system was operated continuously for more than 40 days. No long-term drift was associated in the early elution zone that could be attributable to CO2 absorption into the eluent. Larger volumes of amino acid sample solutions were prepared (~1 L) to maximize the number of injections before needing to remake the solution and reduce the variability associated with manual preparation. The relative peak areas of each analyte during the duration of the experiments are plotted as overlays in FIG. 7. From FIG. 7, it is clear that there is no substantial decay with time for electrode performance as would happen with fixed electrodes that are either fouled or eaten away as shown in FIG. 4 on a gold electrode. The same trend is observed across analytes. There are 4 distinct regions: 1) a startup equilibration region, 2) a stable but high variability region 3) a high drift region, and 4) a stable consistent response region.

Figure 7:
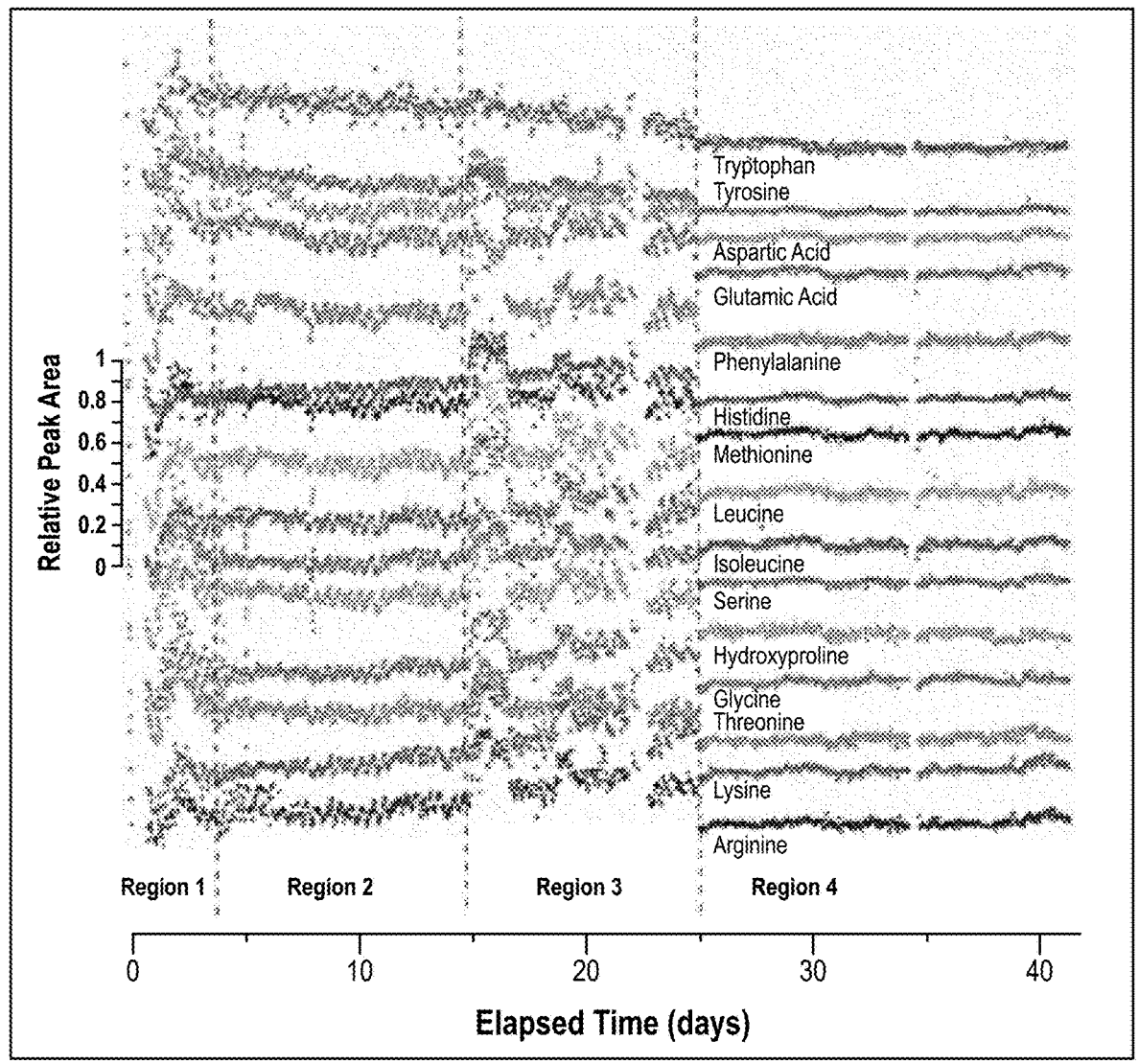
FIG. 7 is a graph of the relative peak areas of the amino acids over repeated injections over about a 40 day time period.
Figure 8:
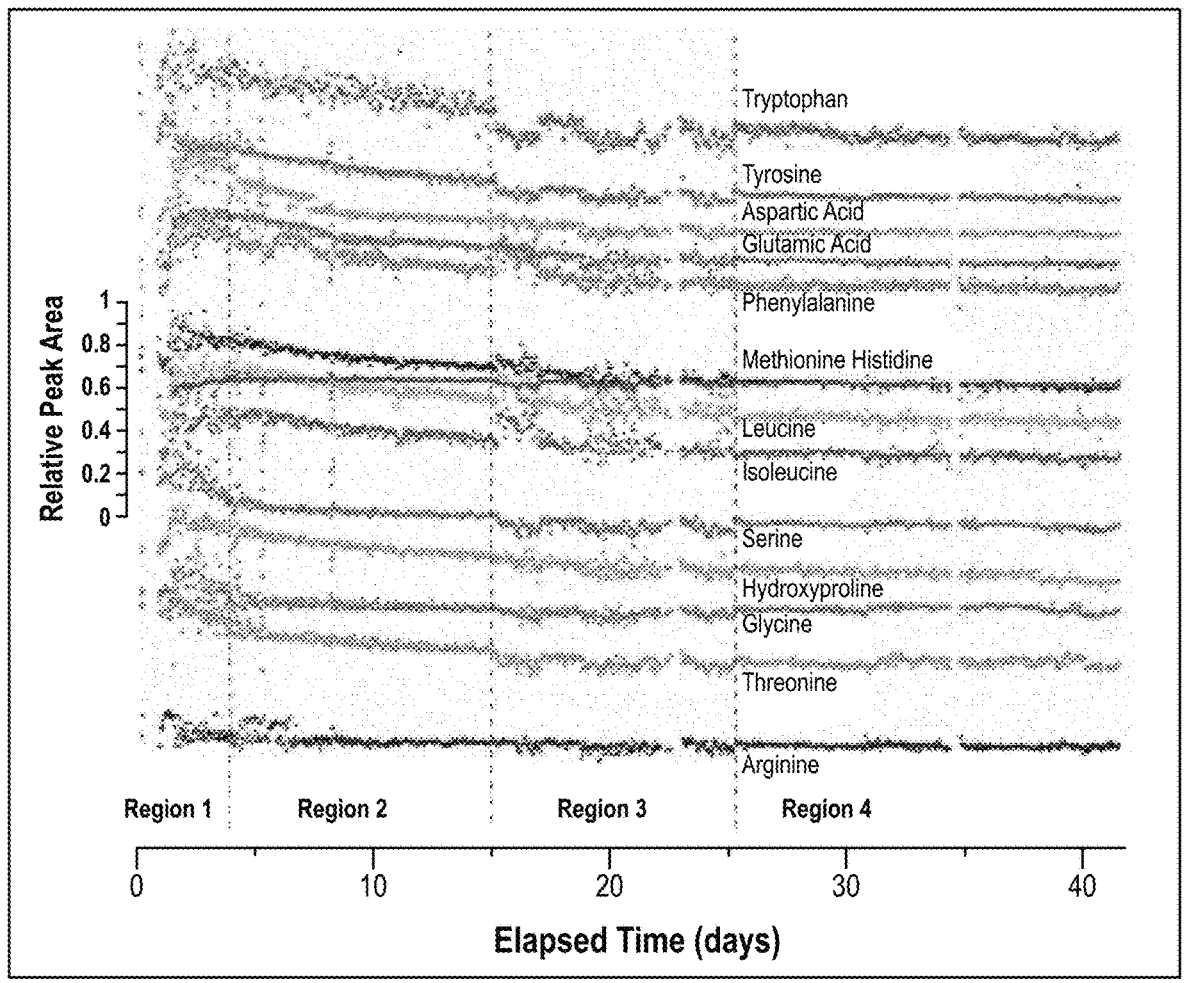
FIG. 8 is a graph of the relative peak areas of the amino acids over repeated injections relative to one of the amino acids (lysine) being used as an internal standard over about a 40 day time period.

There was no evidence of a consistent decay in the electrochemical response based on FIGS. 6 and 7. However, when one of the amino acids, lysine was used as an internal standard, the results showed a more consistent and uniform response, as seen in FIG. 8. Regions 1 and 3 can also be more clearly distinguished. The large change in sensitivity between regions 3 and 4 above is also gone.

The summary of the peak areas for region 4 are provided in Table 1. With the exception of tryptophan, the % RSD was less than 5% over a 16 day period of 475 injections.

TABLE 1

Average Peak Areas over 475 Injections (nA*min)

| | Average Peak Area | SD Peak Area | % RSD |
|---|---|---|---|
| Arginine | 3.14 | 0.10 | 3.29 |
| Lysine | 5.21 | 0.19 | 3.68 |
| Threonine | 4.75 | 0.18 | 3.85 |
| Glycine | 4.64 | 0.14 | 2.99 |
| Hydroxyproline | 3.27 | 0.15 | 4.46 |
| Serine | 5.59 | 0.13 | 2.41 |
| Isoleucine | 2.34 | 0.10 | 4.39 |
| Leucine | 2.46 | 0.11 | 4.41 |
| Methionine | 2.97 | 0.10 | 3.42 |
| Histidine | 4.91 | 0.17 | 3.38 |
| Phenylalanine | 3.17 | 0.12 | 3.86 |
| Glutamic Acid | 2.58 | 0.08 | 3.37 |
| Aspartic Acid | 6.38 | 0.20 | 3.07 |
| Tyrosine | 2.60 | 0.08 | 3.02 |
| Tryptophan | 6.78 | 0.42 | 6.14 |

Example 4—Measurement of Carbohydrates

Figure 9:
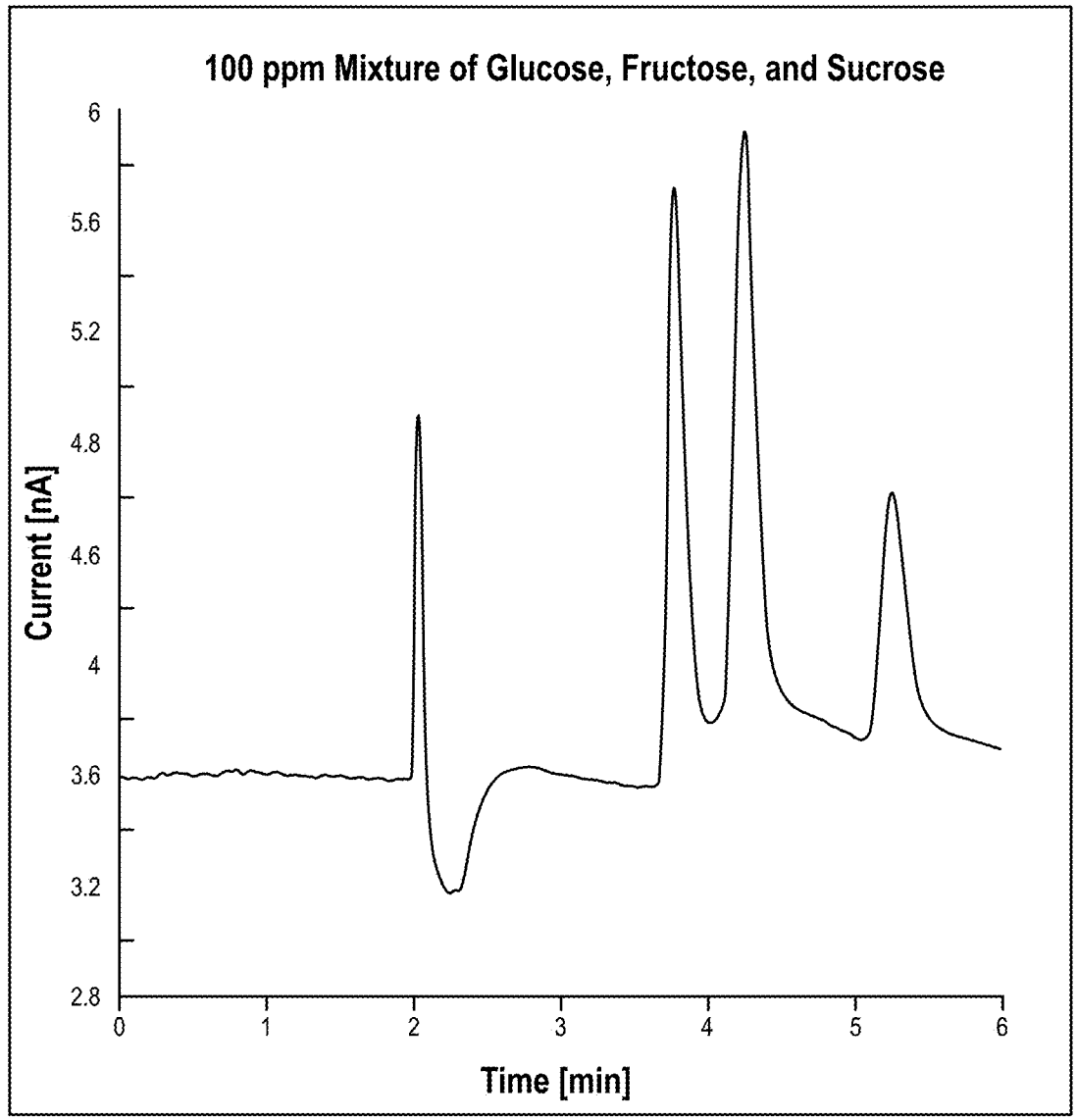
FIG. 9 is a chromatogram of a sample of glucose, fructose, and sucrose, as measured in Example 4.

Four hundred nanoliters of a mixture containing 100 mg/L each of glucose, fructose and sucrose were injected into a CarboPAC PA200 column, 1.0 mm in diameter and 250 mm in length, obtained from Thermo Fisher Scientific. The column was packed with 5 micron particles bearing quaternary ammonium anion exchange functionalities. The column temperature was maintained at 30° C., with 60 mM electrodialytically generated KOH being used as an isocratic eluent. The working electrode was a 0.33 mm dia. copper wire held at 0.940 V with respect to the reference pH electrode. The working electrode was pushed by a 0.3 mm diameter tungsten wire with a 1 cm2 area contact interface behind it. A pressure of 5 psi was applied to the interface. The detector current was acquired at 20 Hz with a rise time of 0.50 s. Glucose, fructose and sucrose respectively elute at 3.80, 4.26, and 5.26 minutes. The chromatogram is shown in FIG. 9.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device comprising an electrochemical cell, wherein the cell comprises a chamber, an inlet port, an outlet port, an electrode port, and a counter electrode;
   wherein the inlet port allows flow of a liquid into the chamber and through a conduit having an inlet opening, and the outlet port allows flow of the liquid out of the chamber;
   wherein the counter electrode is in liquid communication with the cell;
   wherein the electrode port houses a cylindrical, working electrode and is configured to allow a first end of the working electrode to slide into the chamber;
   wherein an area of a first end face of the working electrode is larger than an area of the inlet opening;
   wherein a force generated by the liquid flowing out of the inlet opening toward the first end face of the working electrode is applied to the working electrode, and the first end face of the working electrode is caused by the force generated by the liquid to slide to a distance from a face of the inlet opening in response to the force generated by the liquid.

2. The device of claim 1, wherein the device is further configured so that a second force applied to the working electrode that is applied to a second end face of the working electrode, and the second end face is opposite to the first end face.

3. The device of claim 1, in which the electrode port comprises a sealing material configured to allow the cylindrical working electrode to pierce through the material and to prevent any liquid in the chamber from seeping out of the chamber through the electrode port.

4. The device of claim 1, further comprising a reference electrode in liquid communication with the cell.

5. The device of claim 1, wherein the working electrode comprises copper metal.

6. The device of claim 1, wherein the working electrode comprises gold metal.

7. The device of claim 1, wherein the inlet port and the electrode port are located opposite to each other.

8. The device of claim 1, wherein the electrochemical cell is configured so that the working electrode slides to cover at least a portion of the inlet opening when the liquid flowing out of the inlet opening has stopped.

9. The device of claim 1, wherein the conduit comprises the counter electrode.

10. The device of claim 1, wherein the conduit comprises the counter electrode, and an insulating spacer is located at the end of the counter electrode between the counter electrode and the working electrode.

11. The device of claim 1, further comprising a pneumatic piston configured to apply pressure to a second end of the working electrode so that it can slide into the chamber.

12. The device of claim 1, wherein the distance from the first end face of the working electrode to the face of the inlet opening is a constant distance.

13. A device for the electrochemical detection of analytes in a liquid, the device comprising:
   a chamber having an inlet port, an outlet port and a working electrode port, the inlet port allowing flow of the liquid into the chamber, and the outlet port allowing flow of the liquid out of the chamber;
   a counter electrode in liquid communication with the chamber;
   a working electrode movably housed in the working electrode port and in liquid communication with the chamber and electrical communication with the counter electrode, the working electrode allowing a first end of the working electrode to slide into the chamber, wherein an area of a first end face of the working electrode is larger than an area of the inlet port;

wherein when a force generated by the liquid flowing out of the inlet opening toward the outlet port is applied to the working electrode, and wherein the working electrode is caused by the force generated by the liquid to slide to a known distance from the inlet port opening.

14. The device of claim 13, wherein the analytes are detected by an electrochemical reaction between the analytes and the working electrode and the measuring of the electrical signal generated between the working electrode and the counter electrode.

15. The device of claim 13, in which the working electrode port comprises a sealing material configured to allow the working electrode to pierce through the material and to prevent any liquid in the chamber from seeping out of the chamber through the electrode port.

16. The device of claim 13, wherein the working electrode comprises copper metal.

17. The device of claim 13, wherein the working electrode comprises gold metal.

* * * * *